United States Patent
Sang et al.

(10) Patent No.: US 8,666,327 B2
(45) Date of Patent: Mar. 4, 2014

(54) METHOD AND DEVICE FOR FREQUENCY DEVIATION PRE-CORRECTION

(75) Inventors: Dongsheng Sang, Beijing (CN); Yuemin Cai, Beijing (CN); Xiangqian Zhu, Beijing (CN); Haijun Zhou, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 246 days.

(21) Appl. No.: 13/383,562

(22) PCT Filed: Jul. 13, 2010

(86) PCT No.: PCT/CN2010/001050
§ 371 (c)(1),
(2), (4) Date: Jan. 11, 2012

(87) PCT Pub. No.: WO2011/006352
PCT Pub. Date: Jan. 20, 2011

(65) Prior Publication Data
US 2012/0115423 A1     May 10, 2012

(30) Foreign Application Priority Data
Jul. 13, 2009   (CN) .......................... 2009 1 0088287

(51) Int. Cl.
*H04B 1/40* (2006.01)
(52) U.S. Cl.
USPC ......................................................... 455/75
(58) Field of Classification Search
USPC ........ 455/75, 561, 42, 62, 63.3, 703, 71, 113, 455/136, 139, 154.1, 164.1, 182.1, 192.1
See application file for complete search history.

(56) References Cited

U.S. PATENT DOCUMENTS 3,940,695 A     2/1976  Sickles, II
6,647,276 B1 *  11/2003 Kuwahara et al. ......... 455/562.1

FOREIGN PATENT DOCUMENTS

| CN | 1585289 A    | 2/2005  |
| CN | 1705252 A    | 12/2005 |
| CN | 101369882 A  | 2/2009  |

OTHER PUBLICATIONS

Search Report for International Patent Application No. PCT/CN2010/001050; Oct. 21, 2010.

* cited by examiner

*Primary Examiner* — Eugene Yun
(74) *Attorney, Agent, or Firm* — Barnes & Thornburg LLP

(57) ABSTRACT

A method and device for frequency deviation pre-correction are provided. The method includes: estimating an uplink frequency deviation value of a terminal, and obtaining a historic value of the uplink frequency deviation pre-correction that has been used for the frequency deviation pre-correction of the terminal; according to the historic value of the uplink frequency deviation pre-correction, determining a current value of the uplink frequency deviation pre-correction of the terminal, the current value of the uplink frequency deviation pre-correction being closer to the uplink frequency deviation value than the historic value of the uplink frequency deviation pre-correction; by using the current value of the uplink frequency deviation pre-correction, pre-correcting the frequency deviation of the terminal, thereby the signal detection performance of the terminal can be effectively improved.

16 Claims, 4 Drawing Sheets

METHOD AND DEVICE FOR FREQUENCY DEVIATION PRE-CORRECTION

This application is a US National Stage of International Application No. PCT/CN2010/001050, filed Jul. 13, 2010, designating the United States, and claiming the benefit of Chinese Patent Application No. 200910088287.7, filed with the Chinese Patent Office on Jul. 13, 2009 and entitled "Frequency deviation pre-calibration method and device", both of which are hereby incorporated by reference in their entirety.

FIELD

The present invention relates to the field of radio communications and particularly to a frequency deviation pre-calibration method and device.

BACKGROUND

In a mobile communication system, a base station transmits and receives signals of multiple users at a fixed frequency fc, and a user equipment tracks the frequency of a received signal through Automatic Frequency Control (AFC). In a high-speed movement context, the base station transmits a signal at the frequency fc, and the user equipment receives the signal at a frequency of fc+Δf over a channel, where Δf is a Doppler frequency shift, and both the transmission and reception frequencies of the user equipment settle down around the frequency fc+Δf of the received signal after a period of time elapses. Thus the user equipment transmits a signal at the frequency of fc+Δf, and the base station receives the signal at a frequency of fc+2Δf over an uplink channel, but the reception frequency of the base station is fc, that is, the base station receives the signal with the maximum frequency deviation of 2Δf, as illustrated in FIG. 1.

A user equipment moves away from a base station prior to a cell handover, and the reception frequency of the user equipment settles down around fc−fd as calculated from a Doppler frequency shift. The user equipment moves to a new base station after the handover and receives a signal with a frequency of fc+fd, but the user equipment receives the signal still at the frequency of fc−fd due to the delay of the AFC, thus the user equipment detects the signal with a frequency deviation instantly increased to the maximum value of 2fd, as illustrated in FIG. 2, where bracketed values represent the transmission and reception frequencies of the base station or the user equipment.

The jump of the frequency deviation influences the user equipment due to the sudden increase of the frequency deviation, which causes the performance of the user equipment to deteriorate sharply in a period of time after the handover so that a user may suffer from a degraded experience and even a dropout. Taking a Time Division-Synchronization Code Division Multiple Access (TD-SCDMA) system as an example, the frequency deviation may be up to 1500 Hz in high-speed movement context of 400 Km/h, and the demodulation performance of the user equipment may deteriorate seriously, therefore a solution of frequency deviation pre-calibration at the base station has to be introduced to improve the demodulation performance of the user equipment.

As illustrated in FIG. 3, a fundamental idea of frequency deviation pre-calibration lies in that the base station estimates the Doppler frequency deviation of fd over an uplink channel of a target user and pre-calibrates the frequency of a signal for downlink transmission to the user by the estimated frequency deviation, that is, the downlink transmission frequency is adjusted to fc−fd to pre-compensate for the influence of the downlink frequency deviation so that the user equipment receives the signal with a frequency around the frequency fc and there is no significant influence of the Doppler frequency deviation upon the signal detected by the user equipment to thereby improve the detection performance of the user equipment.

With frequency deviation pre-calibration at the base station, the user equipment hardly experiences an obvious change in the frequency deviation during the cell handover, and here FIG. 4 illustrates a schematic diagram of frequency deviations of transmitted and received signals of the base station and the user equipment after and before the handover, where bracketed values represent the transmission and reception frequencies of the base station or the user equipment. The user equipment transmits a signal at the frequency fc, and the base station receives at the frequency fc the signal with the frequency of fc+fd over an uplink channel and can estimate a frequency deviation of fd. The base station transmitting data to be transmitted to the user in the downlink adjusts the transmission frequency to fc−fd so that the user equipment receives the transmitted signal still at the frequency fc over a downlink channel. The user equipment operates at a frequency stabilized around the cell frequency fc prior to the handover and at a new cell frequency after the handover to thereby alleviate the change in the frequency deviation of the user equipment and to improve the demodulation performance of the user equipment. This solution improves the performance of a network at the cost of increased complexity of the base station.

FIG. 5 illustrates a schematic diagram of a change in a Doppler frequency shift over a high-speed movement channel, and taking a TD-SCDMA system as an example, a frequency locking process is performed for a powered-on user equipment over a broadcast channel, e.g., a Downlink Pilot Time Slot (DwPTS), a Primary Common Control Physical Channel (PCCPCH), etc., and a local oscillator of the frequency locked user equipment operates at the frequency of a received signal. As can be apparent from the relationship of the change in a Doppler frequency shift in FIG. 5, the user equipment is locked at a frequency changing with the location where it is powered on, and the frequency ranges from fc−fd to fc+fd in Hz, where fc represents the frequency of a signal transmitted from the base station and fd represents the maximum Doppler frequency shift.

The existing solution of frequency deviation pre-calibration can not be applied to the broadcast channel, and therefore with the Doppler frequency shift fd of the channel, the user equipment is locked at the frequency of fc+fd, and here a frequency deviation of 2fd is estimated at the side of the base station. If a service is being set up while performing a frequency deviation pre-calibration process over a service channel, then transmission over the service channel is at a frequency of fc−2fd, and the user equipment receives a signal at the frequency of fc−fd over the channel, but the local oscillator of the user equipment operates at the frequency of fc+fd. Here the demodulated signal of the user equipment may be subject to a frequency deviation of 2fd, which is approximately 1500 Hz at a vehicle speed of 400 Km/h in the TD-SCDMA system, thus the performance of detecting the signal at the user equipment may deteriorate seriously.

SUMMARY

Embodiments of the invention provide a frequency deviation pre-calibration method and device to improve the performance of detecting a signal at a user equipment.

An embodiment of the invention provides a frequency deviation pre-calibration method including:

estimating an uplink frequency deviation value of a user equipment and acquiring a historical uplink frequency deviation pre-calibration value for frequency deviation pre-calibration on the user equipment;

determining from the historical uplink frequency deviation pre-calibration value a current uplink frequency deviation pre-calibration value of the user equipment which is closer to the estimated uplink frequency deviation value than the historical uplink frequency deviation pre-calibration value; and performing frequency deviation pre-calibration on the user equipment with the current uplink frequency deviation pre-calibration value.

An embodiment of the invention provides a base station including:

a frequency deviation estimation unit configured to estimate an uplink frequency deviation value of a user equipment;

a frequency deviation determination unit configured to acquire a historical uplink frequency deviation pre-calibration value for frequency deviation pre-calibration on the user equipment and to determine from the historical uplink frequency deviation pre-calibration value a current uplink frequency deviation pre-calibration value of the user equipment which is closer to the estimated uplink frequency deviation value than the historical uplink frequency deviation pre-calibration value; and a frequency deviation pre-calibration unit configured to perform frequency deviation pre-calibration on the user equipment with the current uplink frequency deviation pre-calibration value.

In the invention, a base station estimates an uplink frequency deviation value of a user equipment, acquires a historical uplink frequency deviation pre-calibration value for frequency deviation pre-calibration on the user equipment, determines a current uplink frequency deviation pre-calibration value of the user equipment which is closer to the estimated uplink frequency deviation value than the historical uplink frequency deviation pre-calibration value, and then performs frequency deviation pre-calibration on the user equipment with the determined current uplink frequency deviation pre-calibration value. Since the current uplink frequency deviation pre-calibration value currently used for frequency deviation pre-calibration on the user equipment is generally closer to the uplink frequency deviation value fd than the lastly used historical uplink frequency deviation pre-calibration value, the base station transmits a signal to the user equipment at a frequency closer to $f_c-f_d$ after frequency deviation pre-calibration is performed with the current uplink frequency deviation pre-calibration value, and then the user equipment receives the signal at a frequency closer to $f_c$ over a channel with the Doppler frequency shift, where $f_c$ is the operating frequency of the base station, so that there is no significant frequency deviation in the demodulated signal of the user equipment to thereby improve effectively the performance of detecting the signal at the user equipment.

DETAILED DESCRIPTION

In order to improve the performance of detecting a signal at a user equipment, an embodiment of the invention provides a frequency deviation pre-calibration method in which an uplink frequency deviation pre-calibration value to be used for current frequency deviation pre-calibration on a user equipment is determined according to an estimated uplink frequency deviation value of the user equipment and a historical uplink frequency deviation pre-calibration value for frequency deviation pre-calibration on the user equipment.

Figure 6:
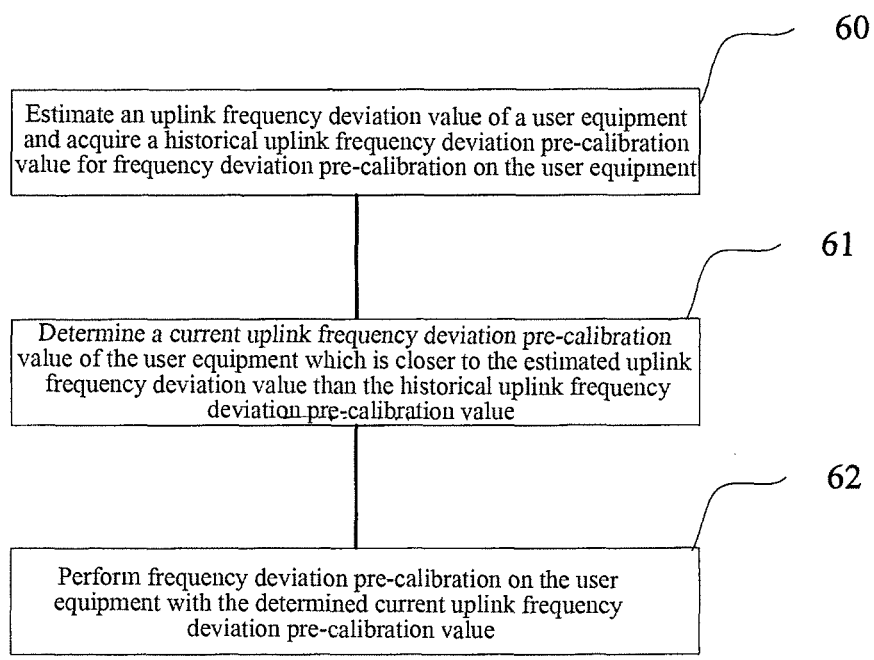
FIG. 6 is a schematic flow chart of a method according to an embodiment of the invention.

Referring to FIG. 6, a frequency deviation pre-calibration method according to an embodiment of the invention particularly includes the following operations 60 to 62.

The operation 60 is to estimate an uplink frequency deviation value of a user equipment and to acquire a historical uplink frequency deviation pre-calibration value for frequency deviation pre-calibration on the user equipment;

The operation 61 is to determine a current uplink frequency deviation pre-calibration value of the user equipment which is closer to the estimated uplink frequency deviation value than the historical uplink frequency deviation pre-calibration value; and The operation 62 is to perform frequency deviation pre-calibration on the user equipment with the determined current uplink frequency deviation pre-calibration value.

In the operation 61, the current uplink frequency deviation pre-calibration value of the user equipment can be determined in the following formula:

$$f_{u,p}(n) = \sum_{m=1}^{M} (a_m * f_{u,p}(n-m)) + b * f_{u,c}(n)$$

Where $f_{u,p}(n)$ is an uplink frequency deviation pre-calibration value of the $n^{th}$ sub-frame of the $u^{th}$ user equipment, i.e., the current uplink frequency deviation pre-calibration value; $f_{u,c}(n)$ is an estimated uplink frequency deviation value of the $n^{th}$ sub-frame of the $u^{th}$ user equipment; $f_{u,p}(n-m)$ is an uplink frequency deviation pre-calibration value of the $(n-m)^{th}$ sub-frame of the $u^{th}$ user equipment, i.e., the historical uplink frequency deviation pre-calibration value; and $a_m$ and b are iteratively smoothing factors above 0 and below 1 and the sum of the iteratively smoothing factors is equal to 1, and M is an integer which is not less than 1.

With the value of m being only 1, the foregoing formula is rewritten as:

$$f_{u,p}(n) = a_1 * f_{u,p}(n-1) + b * f_{u,c}(n)$$

An execution body of the operations 60 to 62 may be a base station or any other network entity capable of estimating an uplink frequency deviation value of the user equipment and performing frequency deviation pre-calibration on the user equipment. When the execution body is a base station, if the user equipment establishes a service connection with the base station while a service is being set up for the user equipment, an initial value of $f_{u,p}(n)$ may be 0 or a preset first frequency deviation value which is a frequency deviation value determined from simulation in an estimated frequency deviation range of a system without significantly deteriorating the performance of the system. For example, the first frequency deviation value may range from 0 to 200 Hz in a TD system.

If a service set up at a source base station has to be continued after the user equipment is handed over to a base station, that is, when the user equipment is handed over to the base station after establishing a service connection with another base station than the base station, then the initial value of $f_{u,p}(n)$ may be a preset second frequency deviation value or an uplink frequency deviation pre-calibration value for frequency deviation pre-calibration of the another base station on the user equipment.

The second frequency deviation value takes a value around the value of the maximum Doppler frequency shift of the user equipment. For example, the second frequency deviation value may range from 500 to 1500 Hz in a TD system. For example, the second frequency deviation value may take the value of 600 Hz in the Doppler frequency shift formula when the user equipment moves at a speed of 200 km/h, the second frequency deviation value may take the value of 1000 Hz in the Doppler frequency shift formula when the user equipment moves at a speed of 300 km/h, and the second frequency deviation value may take the value of 1300 Hz in the Doppler frequency shift formula when the user equipment moves at a speed of 400 km/h.

When the initial value of $f_{u,p}(n)$ takes an uplink frequency deviation pre-calibration value for frequency deviation pre-calibration of the another base station on the user equipment, the another base station prior to the handover shall transmit the uplink frequency deviation pre-calibration value for frequency deviation pre-calibration on the user equipment to the base station after the handover. Specifically in a 2$^{nd}$ Generation (2G) communication system, the another base station prior to the handover shall transmit the uplink frequency deviation pre-calibration value to the base station after the handover through a Base Station Controller (BSC); in a 3$^{rd}$ Generation (3G) communication system, the another base station prior to the handover shall transmit the uplink frequency deviation pre-calibration value to the base station after the handover through a Radio Network Controller (RNC); and in a long Term Evolution (LTE) communication system, the another base station prior to the handover shall transmit the uplink frequency deviation pre-calibration value to the base station after the handover directly through an interface with the base station after the handover. The uplink frequency deviation pre-calibration value for the another base station prior to the handover to perform frequency deviation pre-calibration on the user equipment can be an estimated uplink frequency deviation value or an uplink frequency deviation pre-calibration value determined as in the operation 61.

In order to ensure that a local oscillator of the user equipment moving at a high speed be adjusted at a speed approximate to a speed at which the uplink frequency deviation pre-calibration value $f_{u,p}(n)$ in the formula varies, the value of the iteratively smoothing factor b shall be determined in combination with a solution of adjusting the local oscillator of the user equipment and therefore can be determined in the following formula:

b=the adjustment amount of the local oscillator of the user equipment/(the adjustment period of the local oscillator of the user equipment*a third frequency deviation value), where the third frequency deviation value ranges from the Doppler frequency deviation fd of the user equipment and twice the Doppler frequency deviation, i.e., 2fd. For example, the third frequency deviation value may take the value of fd when the user equipment moves at a speed of 200 km/h, and the third frequency deviation value may take the value of 2fd when the user equipment moves at a speed of 400 km/h.

Of course the base station can determine the current uplink frequency deviation pre-calibration value of the user equipment so that the uplink frequency deviation pre-calibration value is closer to the estimated uplink frequency deviation value than the historical uplink frequency deviation pre-calibration value in the operation 61 alternatively in numerous other implementation methods than the foregoing two formulas. For example, firstly the difference between the uplink frequency deviation value and the historical uplink frequency deviation pre-calibration value is determined, and a convergent step factor is set according to the difference so that the absolute value of the convergent step factor is below twice the difference, and then the convergent step factor is added to the historical uplink frequency deviation pre-calibration value, and the sum thereof is taken as the current uplink frequency deviation pre-calibration value. For example, if the historical uplink frequency deviation pre-calibration value is 2, the estimated uplink frequency deviation value is 5, and the convergent step factor is set to 1, then the current uplink frequency deviation pre-calibration value is 2 plus 1, i.e., 3, and hence closer to the uplink frequency deviation value than the historical uplink frequency deviation pre-calibration value. In another example, if the historical uplink frequency deviation pre-calibration value is 8, the estimated uplink frequency deviation value is 5, and the convergent step factor is set to −1, then the current uplink frequency deviation pre-calibration value is 8 minus 1, i.e., 7, and hence closer to the uplink frequency deviation value than the historical uplink frequency deviation pre-calibration value. Therefore any implementation method in which the current uplink frequency deviation pre-calibration value closer to the uplink frequency deviation value than the historical uplink frequency deviation pre-calibration value can be determined will come into the claimed scope of the invention.

The base station performs frequency deviation pre-calibration on the user equipment with the current uplink frequency deviation pre-calibration value in the operation 62 particularly by performing frequency deviation pre-calibration on data to be transmitted to the user equipment and then transmitting the data at a rated carrier frequency of $fc-f_{u,p}$, where $f_c$ is the operating frequency of the base station, and $f_{u,p}$ is the determined current uplink frequency deviation pre-calibration value.

Preferably after the base station determines the current uplink frequency deviation pre-calibration value of the user equipment and before it performs frequency deviation pre-calibration on the user equipment with the current uplink frequency deviation pre-calibration value, the base station determines the difference between the estimated uplink frequency deviation value and a historical uplink frequency deviation value estimated before the uplink frequency deviation value is estimated, for example, the difference between $f_{u,c}(n)$ and $f_{u,c}(n-1)$ is determined; and determines whether the difference is above a preset first frequency deviation threshold, and if so, then the base station sums up the current uplink frequency deviation pre-calibration value determined in the operation 61 and the difference and takes the sum as the frequency deviation value for frequency deviation pre-calibration. Of course another historical frequency deviation value, e.g., $f_{u,c}(n-2)$, $f_{u,c}(n-3)$ etc., may alternatively be used to take the difference between the uplink frequency deviation values here.

Figure 1:
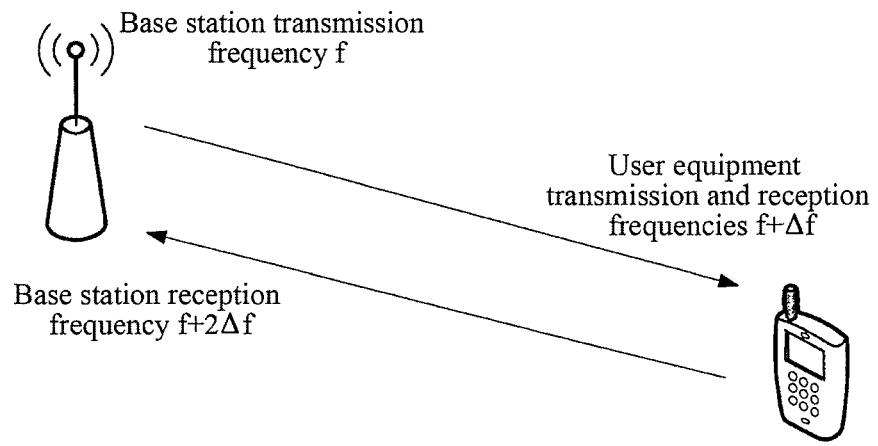
FIG. 1 is a schematic diagram of signal transmission and reception frequencies without a solution of frequency deviation pre-calibration in the prior art.
Figure 2:
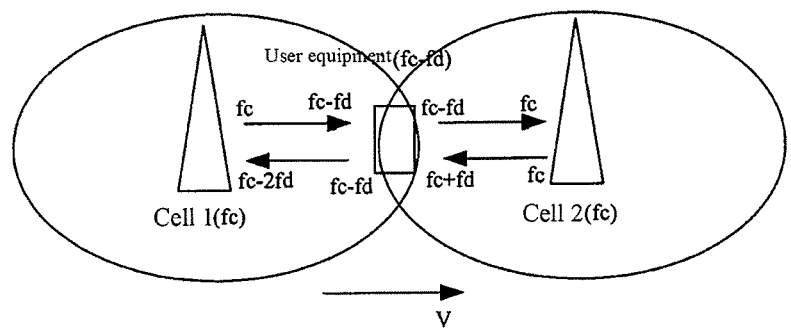
FIG. 2 is a schematic diagram of the signal transmission and reception frequencies for a cell handover of a user equipment without the solution of frequency deviation pre-calibration in the prior art.
Figure 3:
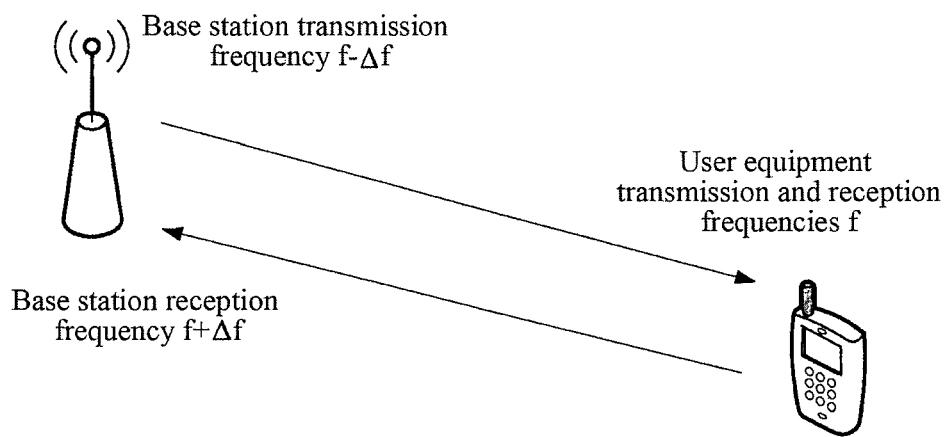
FIG. 3 is a schematic diagram of the signal transmission and reception frequencies with the solution of frequency deviation pre-calibration in the prior art.
Figure 4:
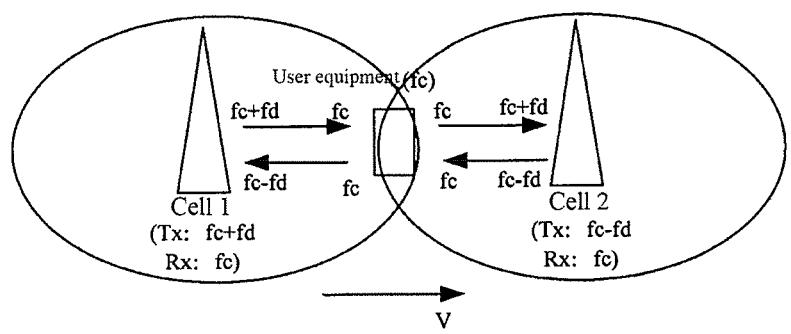
FIG. 4 is a schematic diagram of the signal transmission and reception frequencies for the cell handover of the user equipment with the solution of frequency deviation pre-calibration in the prior art.
Figure 5:
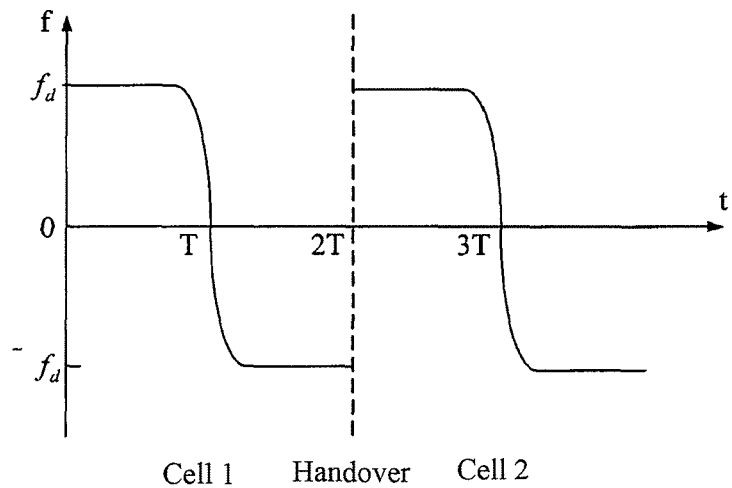
FIG. 5 is a schematic diagram of a change in a Doppler frequency shift over a high-speed movement channel in the prior art.

As can be apparent from the relationship curve of the change in a Doppler frequency shift with traversal of the user equipment across cells illustrated in FIG. 5, the Doppler frequency shift will change rapidly while the user equipment is traversing a coverage area of the base station. Here the variation amount of an estimation result of the frequency deviation can be tracked, and when this variation amount exceeds the set first frequency deviation threshold, it is determined that the Doppler frequency shift over a channel here is changing rapidly, and the variation amount can be added to the frequency deviation pre-calibration value $f_{u,p}(n)$ to ensure the ability of the frequency deviation pre-calibration value to catch up with the changing Doppler frequency shift.

The first frequency deviation threshold can be set with reference to the variation amount in a unit of time of the rapidly changing channel. Specifically two uplink frequency deviation values of the user equipment estimated by the base station are acquired, and the first difference between the two uplink frequency deviation values is determined, then the second difference between the times that the two uplink frequency deviation values are estimated is determined, next the ratio of the first difference to the second difference is determined, and the value of the first frequency deviation threshold is set to the ratio. For example, the value of the first frequency deviation threshold can be determined in the following formula:

$$\text{The first frequency deviation threshold} = (f_{u,c}(n) - f_{u,c}(n-1))/(t1-t2),$$

Where $f_{u,c}(n)$ is an estimated uplink frequency deviation value of the $n^{th}$ sub-frame of the $u^{th}$ user equipment, $f_{u,c}(n-1)$ is an estimated uplink frequency deviation value of the $(n-1)^{th}$ sub-frame of the $u^{th}$ user equipment, t1 is the time that $f_{u,c}(n)$ is estimated, and t2 is the time that $f_{u,c}(n-1)$ is estimated.

Of course other values, e.g., $f_{u,c}(n-1)$ and $f_{u,c}(n-2)$, $f_{u,c}(n-2)$ and $f_{u,c}(n-3)$, etc., can alternatively be used as the two uplink frequency deviation values of the user equipment estimated by the base station.

Preferably after the base station performs frequency deviation pre-calibration on the user equipment with the current uplink frequency deviation pre-calibration value, it determines the difference between the current uplink frequency deviation pre-calibration value determined in the operation 61 and the uplink frequency deviation value estimated in the operation 60, and if the difference is below a preset second frequency deviation threshold, then the base station sets a closeness flag and subsequently selects the estimated uplink frequency deviation value for frequency deviation pre-calibration on the user equipment according to the closeness flag.

In view of such a characteristic of frequency deviation estimation at the base station that the frequency deviation estimated by the base station is approximately the same as the frequency deviation pre-calibration value for downlink transmission when the local oscillator of the user equipment settles down around the frequency fc, and therefore the second frequency deviation threshold can be set, and when the difference between an uplink frequency deviation estimated and the uplink frequency deviation pre-calibration value determined by the base station is below the second frequency deviation threshold, it can be determined that the local oscillator of the user equipment arrives around the frequency fc, and thereafter a pre-calibration process can be performed directly with the estimated uplink frequency deviation estimated for better performance.

The second frequency deviation threshold is a frequency deviation value determined from simulation in an estimated frequency deviation range of the system without significantly deteriorating the performance of the system. For example, the second frequency deviation value can range from 0 to 200 Hz.

The method of the invention will be described below by way of a specific example:

If there are a total number M of User Equipments (UEs) in a current cell, then the operations 1 to 7 of calculating an uplink frequency deviation pre-calibration value for each UE are performed as follows:

The operation 1 is to read and save a frequency deviation of the $m^{th}$ UE, which represents an uplink frequency deviation value of the UE estimated at the side of a base station and includes influences of both a Doppler frequency shift and a frequency deviation of a local oscillator;

The operation 2 is to increment a sub-frame counter of the $m^{th}$ UE by one;

The operation 3 is to process iteratively pre-calibration values of frequency deviation with the read frequency deviation value as in the formula used in the operation 61 to derive an uplink frequency deviation pre-calibration value of a current sub-frame;

The operation 4 is to calculate the difference between estimated uplink frequency deviation values of the current sub-frame and the last sub-frame according to the result of the counter by representing the uplink frequency deviation value for an initial sub-frame as 0;

The operation 5 is to revise the uplink frequency deviation pre-calibration value derived in the operation 3 according to the result of the operation 4: if the difference of the operation 4 is above a first threshold Thre_f1, then the difference is added to the uplink frequency deviation pre-calibration value derived in the operation 3;

The operation 6 is to calculate the difference between the uplink frequency deviation value of the UE and the calculation result of the operation 5, and if the difference is below a second threshold Thre_f2, then a flag is set, and thereafter frequency deviation pre-calibration is performed on the UE directly with the estimated uplink frequency deviation value according to the flag; otherwise, frequency deviation pre-calibration is performed on the UE still with the calculated uplink frequency deviation pre-calibration value; and The operation 7 is to output the uplink frequency deviation pre-calibration value according to the comparison result of the operation 6.

Figure 7:
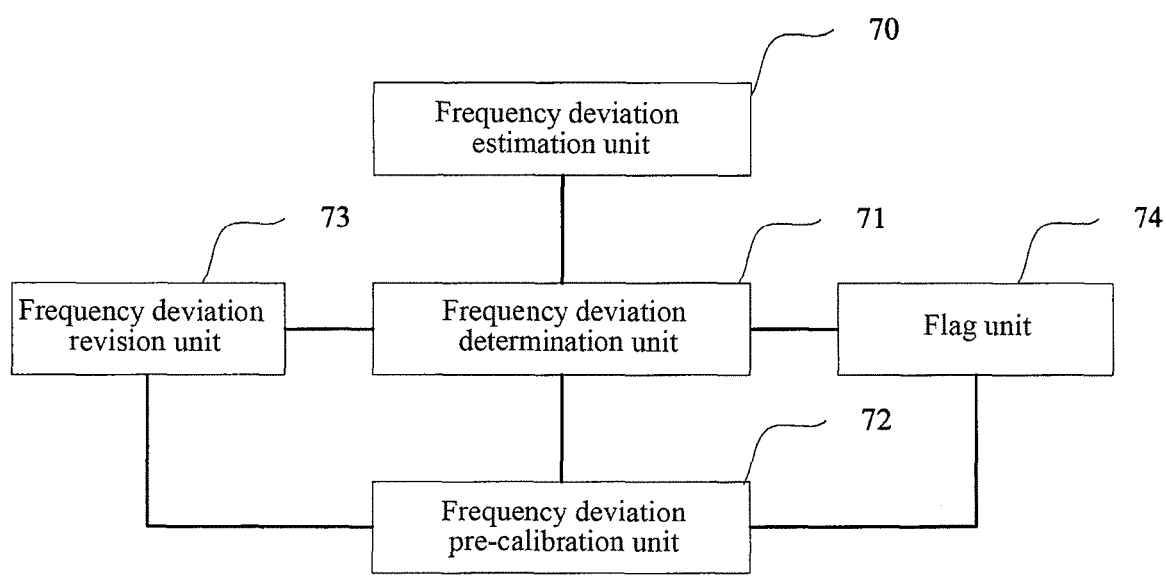
FIG. 7 is a schematic diagram of the structure of a base station according to an embodiment of the invention.

Referring to FIG. 7, an embodiment of the invention further provides a base station including:

A frequency deviation estimation unit 70 configured to estimate an uplink frequency deviation value of a user equipment;

A frequency deviation determination unit 71 configured to acquire a historical uplink frequency deviation pre-calibration value for frequency deviation pre-calibration on the user equipment and to determine from the historical uplink frequency deviation pre-calibration value a current uplink frequency deviation pre-calibration value of the user equipment which is closer to the estimated uplink frequency deviation value than the historical uplink frequency deviation pre-calibration value; and A frequency deviation pre-calibration unit 72 configured to perform frequency deviation pre-calibration on the user equipment with the current uplink frequency deviation pre-calibration value.

The frequency deviation determination unit 71 is configured:

To determine the current uplink frequency deviation pre-calibration value of the user equipment in the following formula:

$$f_{u,p}(n) = \sum_{m=1}^{M} (a_m * f_{u,p}(n-m)) + b * f_{u,c}(n)$$

Where $f_{u,p}(n)$ is an uplink frequency deviation pre-calibration value of the $n^{th}$ sub-frame of the $u^{th}$ user equipment, i.e., the current uplink frequency deviation pre-calibration value; $f_{u,c}(n)$ is an estimated uplink frequency deviation value of the $n^{th}$ sub-frame of the $u^{th}$ user equipment; $f_{u,p}(n-m)$ is an uplink frequency deviation pre-calibration value of the $(n-m)^{th}$ sub-frame of the $u^{th}$ user equipment, i.e., the historical uplink frequency deviation pre-calibration value; and $a_m$ and b are iteratively smoothing factors above 0 and below 1 and the sum of the iteratively smoothing factors is equal to 1, and M is an integer which is not less than 1.

The frequency deviation pre-calibration unit 72 is configured:

To perform frequency deviation pre-calibration on data to be transmitted to the user equipment with the current uplink frequency deviation pre-calibration value and then transmit the data at a rated carrier frequency.

The frequency deviation determination unit 71 is configured to set an initial value of $f_{u,p}(n)$ to 0 or a preset first frequency deviation value when the user equipment establishes a service connection with the base station.

The frequency deviation determination unit 71 is configured to set an initial value of $f_{u,p}(n)$ to a preset second frequency deviation value or an uplink frequency deviation pre-calibration value for frequency deviation pre-calibration of another base station than the base station on the user equipment when the user equipment is handed over to the base station after establishing a service connection with the another base station.

The frequency deviation determination unit 71 is configured to determine the value of the iteratively smoothing factor b in the following formula:

b=the adjustment amount of a local oscillator of the user equipment/(the adjustment period of the local oscillator of the user equipment*a third frequency deviation value), where the third frequency deviation value ranges from a Doppler frequency deviation of the user equipment and twice the Doppler frequency deviation.

The base station further includes:

A frequency deviation revision unit 73 configured to determine the difference between the uplink frequency deviation value and a historical uplink frequency deviation value estimated by the base station before the uplink frequency deviation value is estimated, and if the difference is above a preset first frequency deviation threshold, then sum up the current uplink frequency deviation pre-calibration value and the difference, and take the sum as the current uplink frequency deviation pre-calibration value.

The frequency deviation revision unit 73 is configured:

To acquire two uplink frequency deviation values of the user equipment estimated by the base station, to determine the first difference between the two uplink frequency deviation values, the second difference between the times that the two uplink frequency deviation values are estimated and the ratio of the first difference to the second difference, and to determine the ratio as the value of the first frequency deviation threshold.

The base station further includes:

A flag unit 74 configured to determine the difference between the current uplink frequency deviation pre-calibration value and the uplink frequency deviation value, and if the difference is below a preset second frequency deviation threshold, then set a closeness flag to indicate that the base station subsequently perform frequency deviation pre-calibration on the user equipment with the estimated uplink frequency deviation value.

In summary the invention offers the following advantageous effects:

In the solution according to the embodiments of the invention, a base station estimates an uplink frequency deviation value of a user equipment, acquires a historical uplink frequency deviation pre-calibration value for frequency deviation pre-calibration on the user equipment, determines a current uplink frequency deviation pre-calibration value of the user equipment which is closer to the estimated uplink frequency deviation value than the historical uplink frequency deviation pre-calibration value, and then performs frequency deviation pre-calibration on the user equipment with the determined current uplink frequency deviation pre-calibration value. As compared with the existing solution of frequency deviation pre-calibration, the optimized solution of frequency deviation pre-calibration proposed according to the invention can better cope with the influence upon the detection performance of the user equipment due to general Doppler frequency shifts in a high-speed movement context and improve the performance of detecting a signal at the user equipment, particularly as elucidated below:

Since the current uplink frequency deviation pre-calibration value currently used for frequency deviation pre-calibration on the user equipment is generally closer to the uplink frequency deviation value fd than the lastly used historical uplink frequency deviation pre-calibration value, the base station transmits a signal to the user equipment at a frequency closer to $f_c - f_d$ after frequency deviation pre-calibration is performed with the current uplink frequency deviation pre-calibration value, and then the user equipment receives the signal at a frequency closer to $f_c$ over a channel with the Doppler frequency shift, where $f_c$ is the operating frequency of the base station, so that there is no significant frequency deviation in the demodulated signal of the user equipment to thereby improve effectively the performance of detecting the signal at the user equipment.

Also the value of the iteratively smoothing factor b in the formula of the invention in which the current uplink frequency deviation pre-calibration value is determined can be determined in combination with a solution of adjusting a local oscillator of the user equipment, and it can be ensure that the uplink frequency deviation pre-calibration value for frequency deviation pre-calibration on the user equipment be varying at a speed approximate to a speed at which the local oscillator of the user equipment is adjusted, to accommodate slowly-varying AFC adjustment to the user equipment, thus better coping with the influence upon the detection performance of the user equipment due to general Doppler frequency shifts in a high-speed movement context and improving the performance of the user equipment.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A frequency deviation pre-calibration method, comprising:

estimating an uplink frequency deviation value of a user equipment and acquiring a historical uplink frequency deviation pre-calibration value for frequency deviation pre-calibration on the user equipment;

determining from the historical uplink frequency deviation pre-calibration value a current uplink frequency deviation pre-calibration value of the user equipment which is closer to the estimated uplink frequency deviation value than the historical uplink frequency deviation pre-calibration value; and performing frequency deviation pre-calibration on the user equipment with the current uplink frequency deviation pre-calibration value.

2. The method of claim 1, wherein the current uplink frequency deviation pre-calibration value of the user equipment is determined in the following formula:

$$f_{u,p}(n) = \sum_{m=1}^{M} (a_m * f_{u,p}(n-m)) + b * f_{u,c}(n)$$

wherein $f_{u,p}(n)$ is an uplink frequency deviation pre-calibration value of the $n^{th}$ sub-frame of the $u^{th}$ user equipment, i.e., the current uplink frequency deviation pre-calibration value; $f_{u,c}(n)$ is an estimated uplink frequency deviation value of the $n^{th}$ sub-frame of the $u^{th}$ user equipment; $f_{u,p}(n-m)$ is an uplink frequency deviation pre-calibration value of the $(n-m)^{th}$ sub-frame of the $u^{th}$ user equipment, i.e., the historical uplink frequency deviation pre-calibration value; and $a_m$ and b are iteratively smoothing factors above 0 and below 1 and the sum of the iteratively smoothing factors is equal to 1, and M is an integer which is not less than 1.

3. The method of claim 2, wherein the uplink frequency deviation value of the user equipment is estimated by a base station, and if the user equipment establishes a service connection with the base station, then an initial value of $f_{u,p}(n)$ is 0 or a preset first frequency deviation value.

4. The method of claim 2, wherein the uplink frequency deviation value of the user equipment is estimated by a base station, and if the user equipment is handed over to the base station after establishing a service connection with another base station than the base station, then an initial value of $f_{u,p}(n)$ is a preset second frequency deviation value or an uplink frequency deviation pre-calibration value for frequency deviation pre-calibration of the another base station on the user equipment.

5. The method of claim 2, wherein the value of the iteratively smoothing factor b is determined in the following formula:

b=the adjustment amount of a local oscillator of the user equipment/(the adjustment period of the local oscillator of the user equipment*a third frequency deviation value), wherein the third frequency deviation value ranges from a Doppler frequency deviation of the user equipment and twice the Doppler frequency deviation.

6. The method of claim 1, wherein the performing frequency deviation pre-calibration on the user equipment with the current uplink frequency deviation pre-calibration value comprises:

performing frequency deviation pre-calibration on data to be transmitted to the user equipment with the current uplink frequency deviation pre-calibration value and then transmitting the data at a rated carrier frequency.

7. The method of claim 1, further comprising: after determining the current uplink frequency deviation pre-calibration value of the user equipment and before performing frequency deviation pre-calibration on the user equipment with the current uplink frequency deviation pre-calibration value, determining the difference between the uplink frequency deviation value and a historical uplink frequency deviation value estimated before the uplink frequency deviation value is estimated, and if the difference is above a preset first frequency deviation threshold, then summing up the current uplink frequency deviation pre-calibration value and the difference and taking the sum as the current uplink frequency deviation pre-calibration value.

8. The method of claim 7, wherein the first frequency deviation threshold is determined by:

acquiring two estimated uplink frequency deviation values of the user equipment, and determining the first difference between the two uplink frequency deviation values, the second difference between the times that the two uplink frequency deviation values are estimated and the ratio of the first difference to the second difference; and determining the ratio as the value of the first frequency deviation threshold.

9. The method of claim 1, further comprising: after performing frequency deviation pre-calibration on the user equipment with the current uplink frequency deviation pre-calibration value, determining the difference between the current uplink frequency deviation pre-calibration value and the uplink frequency deviation value, and if the difference is below a preset second frequency deviation threshold, then setting a closeness flag and subsequently selecting the estimated uplink frequency deviation value for frequency deviation pre-calibration on the user equipment according to the closeness flag.

10. A base station, comprising:

a frequency deviation estimation unit configured to estimate an uplink frequency deviation value of a user equipment;

a frequency deviation determination unit configured to acquire a historical uplink frequency deviation pre-calibration value for frequency deviation pre-calibration on the user equipment and to determine from the historical uplink frequency deviation pre-calibration value a current uplink frequency deviation pre-calibration value of the user equipment which is closer to the estimated uplink frequency deviation value than the historical uplink frequency deviation pre-calibration value; and a frequency deviation pre-calibration unit configured to perform frequency deviation pre-calibration on the user equipment with the current uplink frequency deviation pre-calibration value.

11. The base station of claim 10, wherein the frequency deviation determination unit is configured:

to determine the current uplink frequency deviation pre-calibration value of the user equipment in the following formula:

$$f_{u,p}(n) = \sum_{m=1}^{M} (a_m * f_{u,p}(n-m)) + b * f_{u,c}(n)$$

wherein $f_{u,p}(n)$ is an uplink frequency deviation pre-calibration value of the $n^{th}$ sub-frame of the $u^{th}$ user equipment, i.e., the current uplink frequency deviation pre-calibration value; $f_{u,c}(n)$ is an estimated uplink frequency deviation value of the $n^{th}$ sub-frame of the $u^{th}$ user equipment; $f_{u,p}(n-m)$ is an uplink frequency deviation pre-calibration value of the $(n-m)^{th}$ sub-frame of the $u^{th}$ user equipment, i.e., the historical uplink frequency deviation pre-calibration value; and $a_m$ and b are iteratively smoothing factors above 0 and below 1 and the sum of the iteratively smoothing factors is equal to 1, and M is an integer which is not less than 1.

12. The base station of claim 11, wherein the frequency deviation determination unit is configured:
   to set an initial value of $f_{u,p}(n)$ to 0 or a preset first frequency deviation value when the user equipment establishes a service connection with the base station; or
   to set an initial value of $f_{u,p}(n)$ to a preset second frequency deviation value or an uplink frequency deviation pre-calibration value for frequency deviation pre-calibration of another base station than the base station on the user equipment when the user equipment is handed over to the base station after establishing a service connection with the another base station.

13. The base station of claim 11, wherein the frequency deviation determination unit is configured:
   to determine the value of the iteratively smoothing factor b in the following formula:
   b=the adjustment amount of a local oscillator of the user equipment/(the adjustment period of the local oscillator of the user equipment*a third frequency deviation value), wherein the third frequency deviation value ranges from a Doppler frequency deviation of the user equipment and twice the Doppler frequency deviation.

14. The base station of claim 10, further comprising:
   a frequency deviation revision unit configured to determine the difference between the uplink frequency deviation value and a historical uplink frequency deviation value estimated by the base station before the uplink frequency deviation value is estimated, and if the difference is above a preset first frequency deviation threshold, then sum up the current uplink frequency deviation pre-calibration value and the difference, and take the sum as the current frequency deviation pre-calibration value.

15. The base station of claim 14, wherein the frequency deviation revision unit is configured:
   to acquire two uplink frequency deviation values of the user equipment estimated by the base station and to determine the first difference between the two uplink frequency deviation values, the second difference between the times that the two uplink frequency deviation values are estimated and the ratio of the first difference to the second difference; and
   to determine the ratio as the value of the first frequency deviation threshold.

16. The base station of claim 10, further comprising:
   a flag unit configured to determine the difference between the current uplink frequency deviation pre-calibration value and the uplink frequency deviation value, and if the difference is below a preset second frequency deviation threshold, then set a closeness flag to indicate that the base station subsequently performs frequency deviation pre-calibration on the user equipment with the estimated uplink frequency deviation value.

* * * * *